W. B. MURRAY.
TRAIN CONTROL MEANS.
APPLICATION FILED JULY 27, 1912. RENEWED MAR. 29, 1916.

1,203,242.

Patented Oct. 31, 1916.
10 SHEETS—SHEET 4.

Witnesses
J. Milton Jester
B. F. Kilburn

Inventor
W. B. Murray

By
C. L. Parker
Attorney

W. B. MURRAY.
TRAIN CONTROL MEANS.
APPLICATION FILED JULY 27, 1912. RENEWED MAR. 29, 1916.

1,203,242. Patented Oct. 31, 1916.
10 SHEETS—SHEET 6.

Witnesses
Inventor
W. B. Murray
By C. L. Parker
Attorney

W. B. MURRAY.
TRAIN CONTROL MEANS.
APPLICATION FILED JULY 27, 1912. RENEWED MAR. 29, 1916.

1,203,242.

Patented Oct. 31, 1916.
10 SHEETS—SHEET 9.

Fig. 18

Witnesses
Inventor
W. B. Murray
By
C. L. Parker
Attorney

UNITED STATES PATENT OFFICE.

WILLIAM B. MURRAY, OF WASHINGTON, DISTRICT OF COLUMBIA, ASSIGNOR TO THE MILLER TRAIN CONTROL CORPORATION, OF STAUNTON, VIRGINIA, A CORPORATION OF VIRGINIA.

TRAIN-CONTROL MEANS.

1,203,242.        Specification of Letters Patent.        Patented Oct. 31, 1916.

Application filed July 27, 1912, Serial No. 711,792. Renewed March 29, 1916. Serial No. 87,654.

*To all whom it may concern:*

Be it known that I, WILLIAM B. MURRAY, a citizen of the United States, residing at Washington, in the District of Columbia, have invented certain new and useful Improvements in Train-Control Means, of which the following is a specification.

The present invention relates to mechanically operated and electrically controlled train control systems, adapted to be used in connection with steam or electric railroads, to prevent collisions and other accidents.

An important object of the invention is to provide mechanically operated apparatus for actuating mechanism for automatically stopping a train where there is danger of accident, such mechanically operated apparatus being controlled in its operation by electrical means, which operates at a fixed point along the track to cause the said apparatus to stop the train when there is a failure of current therethrough arising from opening the circuit, caused by an accident, injury to the system, a failure of a signal to operate, or from any other cause, or by a failure of the source of current.

Another object of this invention is to provide train stopping mechanism in conjunction with signal means, said mechanism being adapted to cause the stoppage of a train when the signal means are falsely set, as for example to indicate a clear block, when in fact the block is occupied by another train.

A further object of this invention is to provide means of the above mentioned character, adapted to take care of the engine or train irrespective of the disability or inaction of the engineer.

A further object of the invention is to provide in addition to train stopping means, mechanically operated and electrically controlled means for actuating a signal in the cab for indicating caution, said signal being operated by the absence of current through the signal control mechanism.

A further object of the invention is to provide means of the above mentioned character, especially adapted for use in connection with a three-point railway signal system, whereby (*a*) when the signal is at danger the engine will be automatically stopped, (*b*), when the signal is at caution a signal in the cab will be operated to apprise the engineer of such condition without stopping the engine, and (*c*), when the signal is clear the engine will be permitted to pass.

A further object of the invention is to provide means of the above mentioned character, which may be successfully operated with both direct and alternating currents.

A further object of the invention is to provide means for stopping the engine after it enters a clear block is case the signal should not be properly set to protect the rear of the engine.

A further object of the invention is to provide mechanically operated and electrically controlled apparatus of the above mentioned character, which is comparatively simple in construction and cheap to manufacture.

A further object of the invention is to provide means of the above mentioned character, which are positive and reliable in operation, and not liable to derangements.

Other objects and advantages of the invention will be apparent during the course of the following description.

In the accompanying drawings forming a part of this specification and in which like numerals are employed to designate like parts throughout the same, Fig. 3 is a further enlarged fragmentary side view of the ramp, showing securing means for the same, Fig. 4 is a transverse sectional view taken through the ramp near the securing means, the same being shown in elevation.

Figure 1:
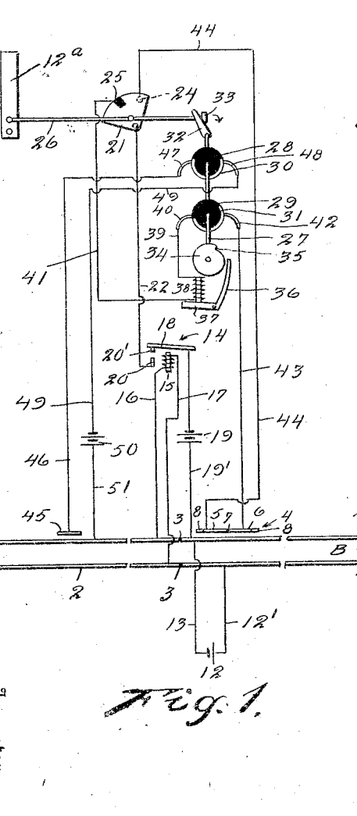
Figure 1 is a diagrammatic view of a track, circuits, and associated elements included in the system, Fig. 1ª is a diagrammatic view of a modified form of means to connect and disconnect the auxiliary ramp to and from the source of current.

In the drawings, wherein for the purpose of illustration, I have shown a preferred embodiment of my invention, attention being called more particularly to Fig. 1, the numerals 1 and 2 designate track rails, insulated at spaced intervals, as shown at 3, to provide blocks A, B, C, and D of suitable lengths. As indicated by the arrow, the traffic is in one direction, from right to the left. Disposed outwardly of the track rail 1 and suitably near the entrance end of each block is a ramp 4, which is inclined longitudinally in a vertical plane and comprises ramp sections 5 and 6, insulated from each other, as shown at 7. At their outer ends, the ramp sections are connected with and insulated from extensions 8, included in the ramp. These extensions extend below the track rail 1 and engage the railroad bed. The extensions 8 never have connection with any source of current and serve to slightly mechanically operate the apparatus before it is operated by the ramp sections, but this operation is not sufficient to actuate the train stopping means, as will be apparent hereinafter. The ramp sections 5 and 6 and extensions 8 are formed of ordinary track rails, held in place by clamping brackets 9, as shown. These clamping brackets are rigidly connected with fixed supports or chairs 10 by means of bolts 11. The chairs 10 suitably increase in height toward the inner ends of the ramp sections 5 and 6, to properly hold such ramp sections in their vertically inclined positions.

At the right or entrance ends of the blocks A, B and C are disposed semaphores comprising vertically swinging paddles 12$^a$, 12$^b$ and 12$^c$, respectively. It is to be understood that like semaphores are placed at the entrance end of the remaining blocks. The semaphore paddles are adapted to assume three positions, a horizontal to indicate danger, as shown by the paddle 12$^a$, an intermediate position to indicate caution, as shown by the paddle 12$^b$, and a lowermost position to indicate a clear block, as shown by the paddle 12$^c$. These semaphore paddles may be either manually moved or operated by any ordinary electrically controlled system or systems. The ramp sections 5 and 6 being disposed suitably near the entrance ends of the block, control the passage of the engine or train from one block to the right into the next block to the left.

At the exit end of each block is disposed a source of current 12 connected by the wire 12′ with the rail 2 and connected with the rail 1 by a wire 13. Disposed at the entrance end of each block is a relay 14, comprising an electro-magnet 15, having its winding connected with the rails 1 and 2 by wires 16 and 17, as shown. Disposed near the electro-magnet is an armature 18, which is held adjacent such electro-magnet when the same is energized but will automatically move away from the electro-magnet when it is deënergized. As long as the block is clear or unoccupied by an engine or the like, it is obvious that the track circuit is closed and the electro-magnet 15 will be energized. In this closed circuit, current flows from one side of the source of current 12, through wire 12′, rail 2, wire 17, electro-magnet 15, wire 16, rail 1, wire 13, and back to the opposite pole of the source of current 12. When an engine travels into the entrance end of the block, the above referred to circuit is made through the engine and the electro-magnet 15 is cut out of circuit and deënergized.

The numeral 19 designates a source of current having one pole connected with a wire 19′ which is connected with the rail 1 and its opposite pole electrically connected with the armature 18, as shown. The numeral 20 designates a stationary contact disposed near the armature 18 and adapted to be engaged by a contact 20′, carried by said armature, when the electro-magnet 15 is energized. The engagement between the contacts 20 and 20′ is broken when the electro-magnet 15 is deënergized. The stationary contact 20 has electrical connection with a pivoted metal contact segment 21, through the medium of a wire 22. The segment 21 coöperates with stationary contacts 23 and 24 and is provided at its curved edge intermediate the ends thereof with an insulating block 25, as shown. The contact segment 21 swings in a vertical plane and is adapted to assume three positions, to wit, an upper to bring the insulating block 25 into engagement with the stationary contact 23 and the metal portion thereof in engagement with the stationary contact 24, an intermediate position to bring the metal portion of the contact in engagement with the stationary contact 23 and the insulating block 25 in engagement with the stationary contact 24, and a lowermost position to bring its metal portion in engagement with both stationary contacts 23 and 24. The contact segment 21 is moved synchronously with its signal paddle and has operative connection therewith through the medium of a rigid rod 26, pivotally connected with the paddle and the segment, as shown.

Disposed near each of the contact segments 21 is a switch device comprising a horizontal rock-shaft 27, carrying rolls 28 and 29, provided respectively with metallic contact segments 30 and 31, as shown. The shaft 27 is turned in one direction by a gravity operated crank arm 32, having a suitable opening formed therethrough to receive the rod 26, such rod being provided at its lower end with a head 33. Rigidly connected with one end of the rock-shaft 27 is a disk 34, provided with a shoulder 35, adapted to be engaged by a pivoted holding pawl 36. This holding pawl is returned to and retained in its normal position by its horizontal arm 37. When this holding pawl is in its normal position, its vertical arm engages the shoulder 35 and thus prevents the turning of the rock-shaft 27 in one direction. The horizontal arm 37 of the holding pawl 36 is moved to release the rock-shaft 27 in order that the crank arm 32 may swing downwardly, as indicated by the arrow, by an electro-magnet 38 having one end of its winding connected with a wire 39 which is connected with a contact 40 adapted to engage the segment 31 when the rock-shaft 27 is in its normal position. The opposite end of the winding of the electro-magnet 38 is connected with a wire 41 having its opposite end connected with the stationary contact 23. The contact segment 31 is also engaged when in its normal position by a contact 42, connected with a wire 43, which is connected with the ramp section 6. Connected with the stationary contact 24 is a wire 44, which is connected with the ramp section 5.

Disposed near and inwardly of the entrance end of each block is an auxiliary ramp 45, which is curved longitudinally in a vertical plane. This auxiliary ramp is connected with a wire 46, which is connected with a contact 47, which always remains in electrical connection with the contact segment 30.

The numeral 48 designates a co-acting contact which, as shown in Fig. 1, engages the contact segment 30 only when the rock-shaft 27 is turned upwardly upon the semaphore blade being moved to its uppermost or danger position. The contact 48 is connected with a wire 49, connected with one pole of a source of current 50, having its opposite pole connected with the track rail 1 through the medium of a wire 51. If the train is traveling quite fast and the semaphore paddle should be slowly swung toward its upper or danger position, the train might reach the auxiliary ramp 45 before the paddle had time to complete its movement. The train would then be improperly stopped by the time the paddle has reached the danger or stop position. To overcome this difficulty I propose to adjustably mount the roll 28 upon the rock-shaft 27, so that the roll may be unlocked therefrom and turned with relation to, and subsequently locked to the rock-shaft 27. By thus turning the roll 28 with relation to the rock-shaft 27, one end of the segment 30 may be brought sufficiently near the contact 48, so that it will engage said contact 48 when the semaphore paddle has swung upwardly to its intermediate position and before it reaches its uppermost position.

Figure 1A:
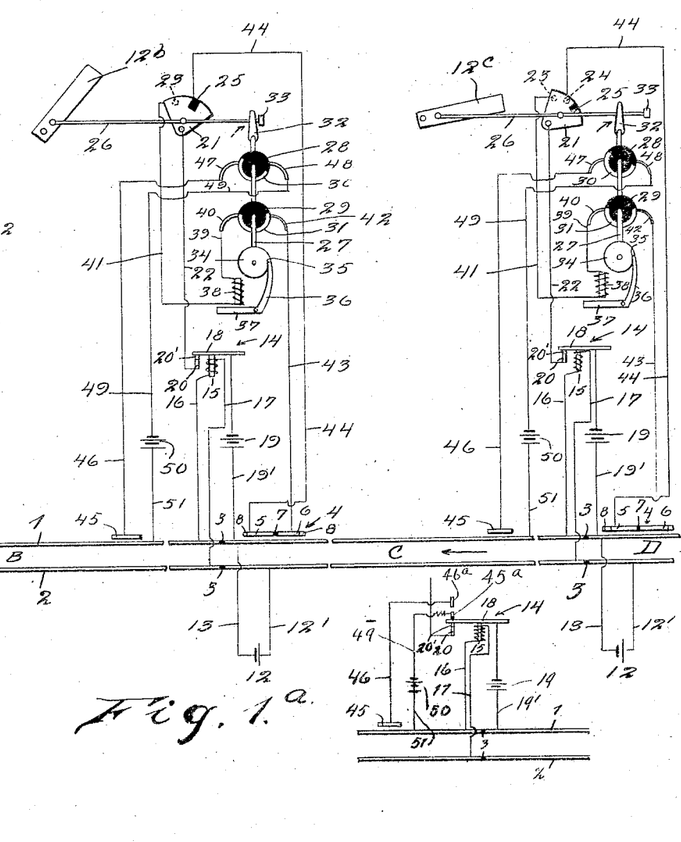
Figure 2:
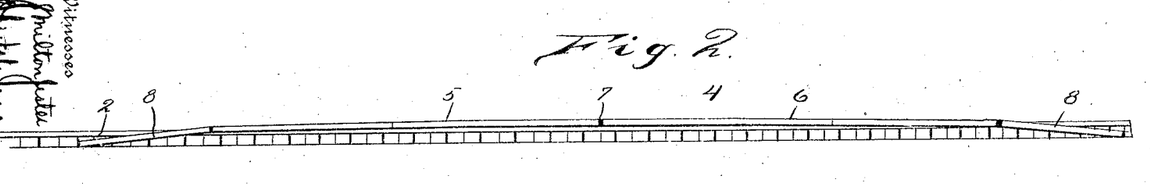
Fig. 2 is a side view of a ramp, Fig. 2ª is an enlarged fragmentary side view of the same.
Figures 2A, 3, 4:
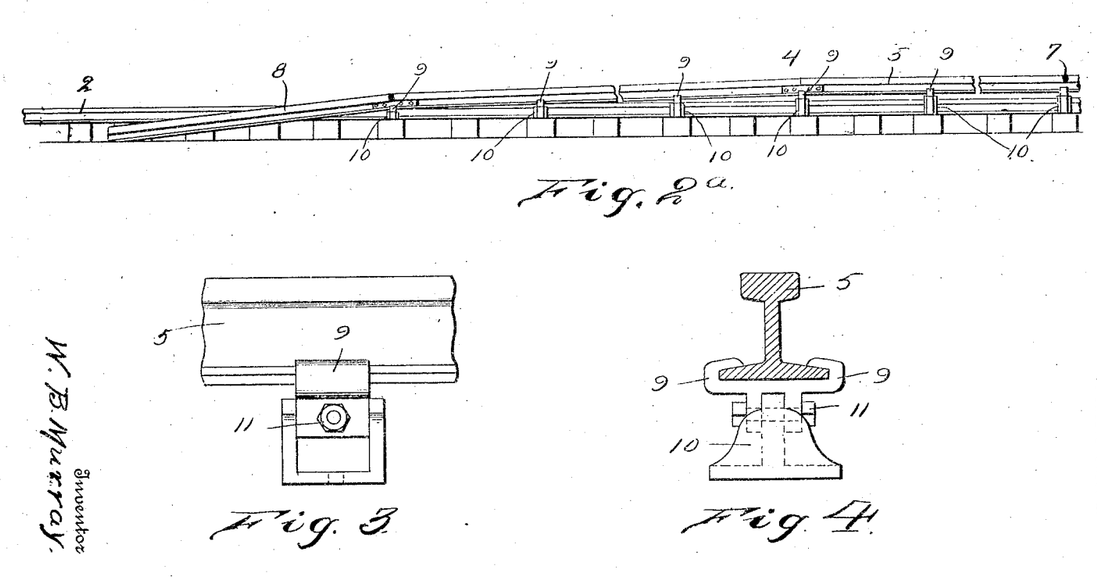

In Fig. 1ª I have shown the auxiliary ramp 45 connected with the source of current 50 through means which are operated by the relay 14. In this figure the reference character 45ª designates a contact which is rigidly connected with and insulated from the armature 18, as shown. The wire 49 is connected with the contact 45ª. The numeral 46ª designates a stationary contact which is engaged by contact 45ª only when the relay is deënergized. The wire 46 is connected with stationary contact 46ª. When the train enters the block, the electro-magnet 15 is deënergized and the armature 18 will move away from said electromagnet. Should the armature 18 stick and not open, the auxiliary ramp 45 will have no electrical connection with the source of current, whereby the train will be stopped by the same.

Figure 5:
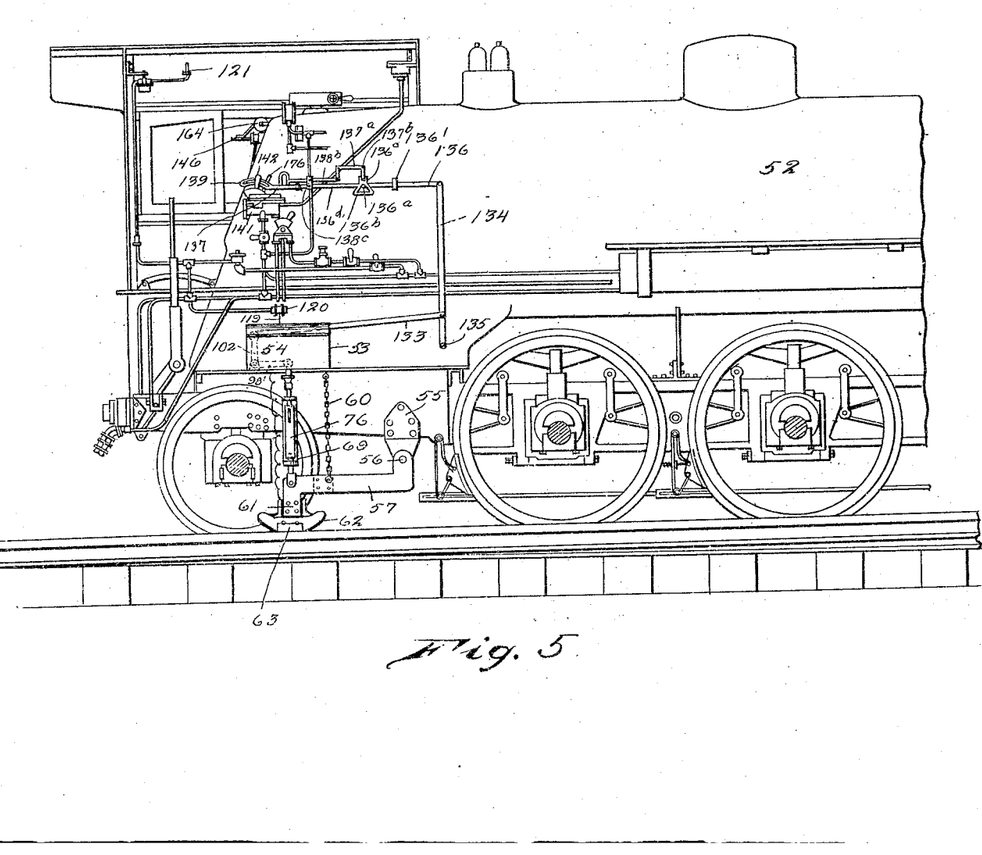
Fig. 5 is a side view of the rear portion of a locomotive, showing my apparatus applied thereto.
Figures 6, 7, 8, 9:
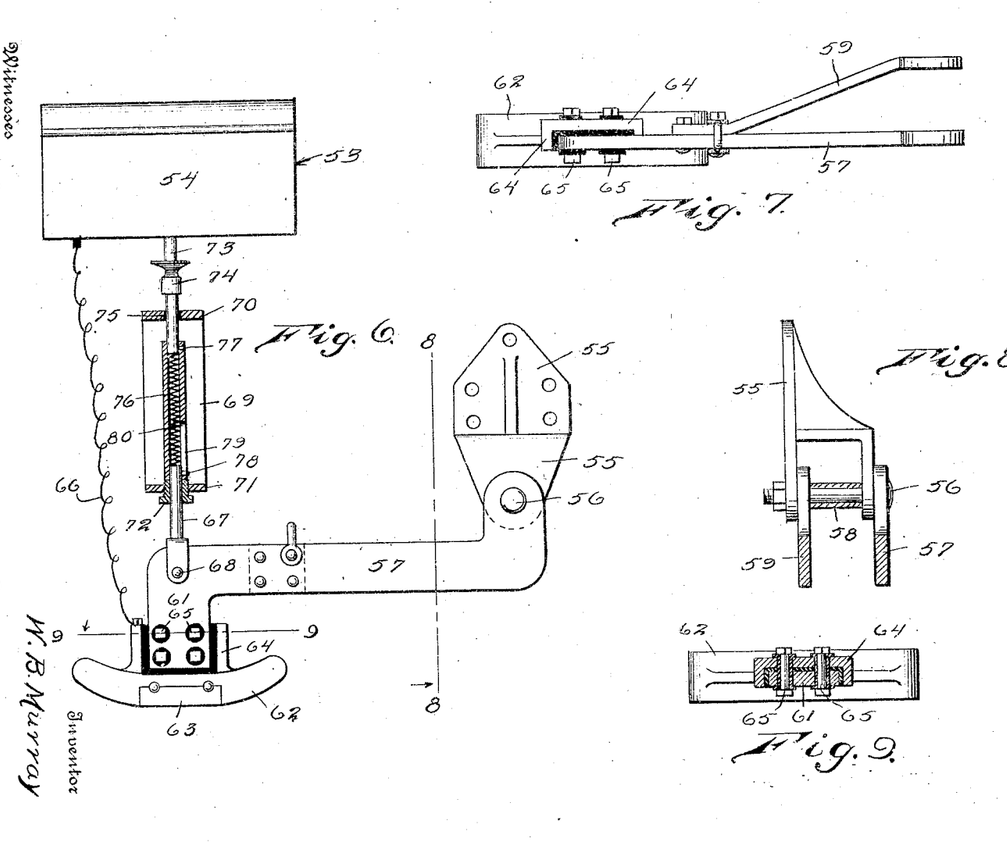
Fig. 6 is an enlarged side elevation of the apparatus removed from the locomotive, parts thereof being shown in section.
Fig. 7 is a plan view of the shoe and the pivoted securing arm therefor.
Fig. 8 is a vertical sectional view taken on line 8—8 of Fig. 6 and looking in the direction of the arrow.
Fig. 9 is a horizontal sectional view taken on line 9—9 of Fig. 6 and looking in the direction of the arrow.
Figure 10:
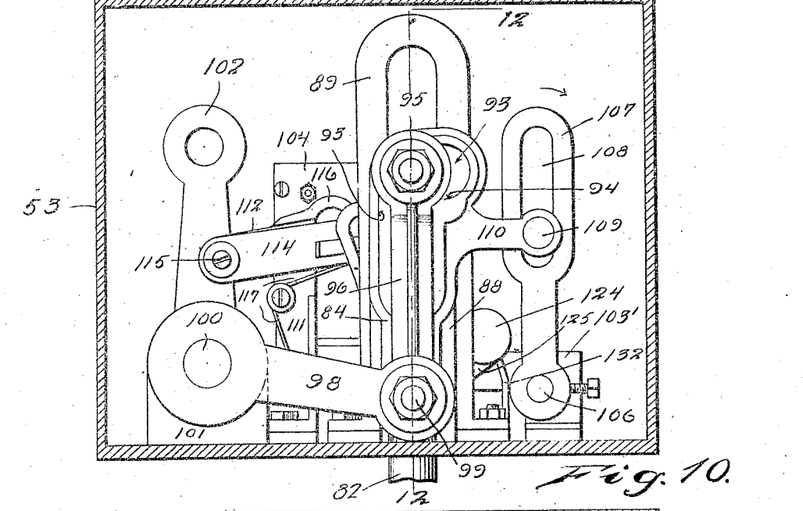
Fig. 10 is a side view of the mechanically operated and electrically controlled apparatus, the same being energized and the mechanically operated elements being shown in their lower positions.
Figure 11:
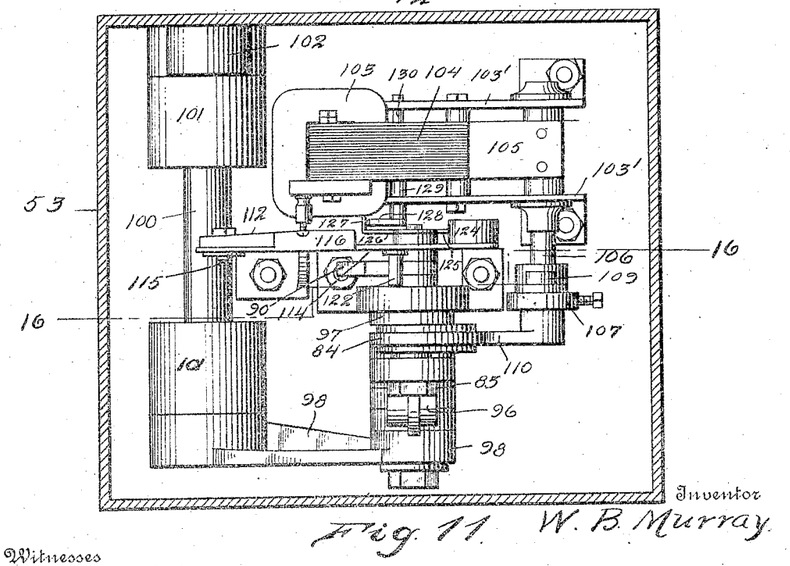
Fig. 11 is a plan view of the same.

Attention is now called more particularly to Figs. 5 to 9, inclusive. In Fig. 5 is shown a locomotive 52, to one side and near the rear end of which is rigidly secured a casing or box 53, provided with a removable outer side or door 54. Within this casing is disposed the mechanically operated and electrically controlled apparatus to be described. Rigidly connected with the lower portion of the locomotive is a forked bracket 55 to which is pivotally connected, through the medium of a bolt 56, the forward forked end of a vertically swinging arm 57. A spacing sleeve 58 surrounds the bolt 56 in the forked end of the bracket 55 and holds the inner tine 59 from displacement. The numeral 60 designates a normally slack safety chain, or other flexible element, which is attached to the securing arm and to the body portion of the locomotive, as shown. At its lower end, the securing arm 57 has a depending end portion 61, disposed at substantially right angles to the horizontal portion of such securing arm. The numeral 62 designates a shoe, provided between its ends with a recess for receiving a hard steel block 63, having electrical connection with the shoe and held in place by any suitable means. The shoe 62 is provided with an upwardly extending shank 64, which is grooved for receiving the depending end portion 61, as shown. Insulating material is disposed between the shank 64 and the depending end portion 61 and insulated bolts 65 serve to hold these elements together. It is thus seen that the shoe 62 is securely attached to the swinging arm 57 and is thoroughly insulated therefrom. As shown in Fig. 6, a wire 66 is electrically connected with the shoe 62 and extends upwardly for electrical connection with the mechanically operated and electrically controlled apparatus disposed within the casing or box 53. A push rod 67 has its lower end forked and straddling the rear end of the securing arm 57 and pivotally connected therewith, as shown at 68. Rigidly connected with the body portion of the engine, by any suitable means, is a vertical bracket 69, having horizontal end portions 70 and 71. An adjusting sleeve 72 has screw-threaded engagement within an opening formed in the lower horizontal end portions 71 and receives therethrough the reciprocatory push rod 67. An upper push rod 73 has connection with the apparatus in the casing 53. The upper push rod 73 is provided between its ends with a stop 74 rigidly mounted thereon, such push rod reciprocating through an opening 75 formed in the upper horizontal end portion 70 of the bracket 69. The function of the stop 74 is to provide positive means to prevent any further upward movement of the rod which would be greater than the distance between said stop and the casing 53. A connecting sleeve 76 which is disposed within the bracket 69 has rigid connection with the lower end of the push rod 73, by means of a pin 77 and also slidably receives the upper end of the push rod 67. At its upper end, the push rod 67 carries a pin 78, operating in an elongated slot 79 formed through the lower portion of the connecting sleeve 76. A compressible coil spring 80 of suitable stiffness is disposed in the connecting sleeve 76 and is interposed between the push rods 67 and 73, as shown. This connecting sleeve normally engages the adjusting sleeve 72 and it is thus seen that by turning such adjusting sleeve 72 the push rod 67 and shoe 62 may be permanently vertically adjusted.

Figure 12:
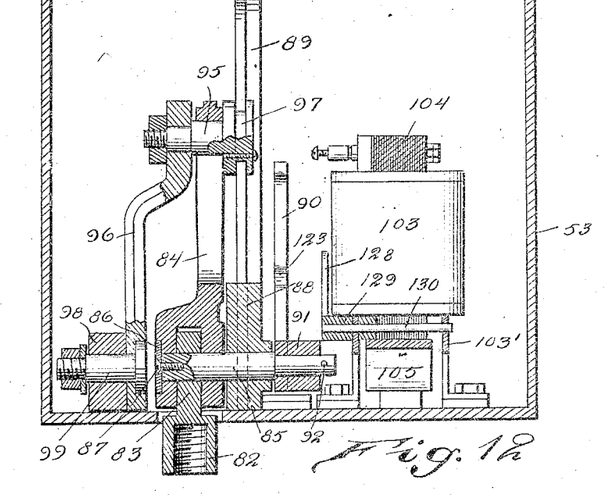
Fig. 12 is a transverse sectional view taken on line 12—12 of Fig. 10.
Figure 13:
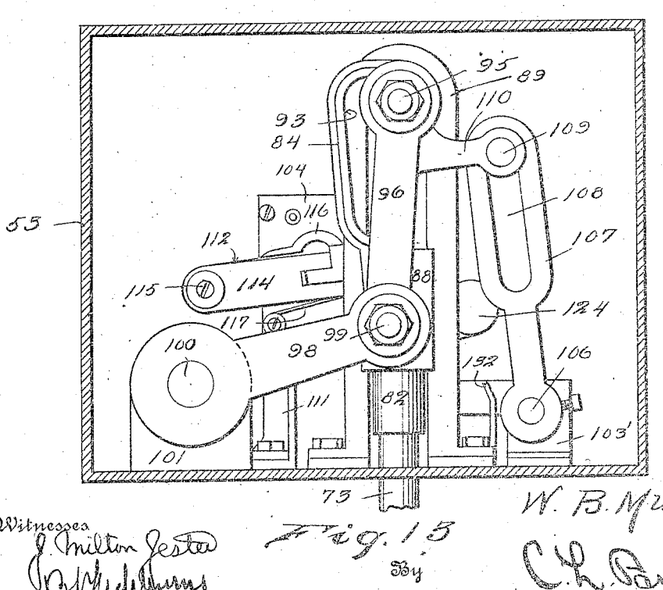
Fig. 13 is a side view of the apparatus, the same being deënergized and the mechanically operated elements being in their elevated positions.
Figure 14:
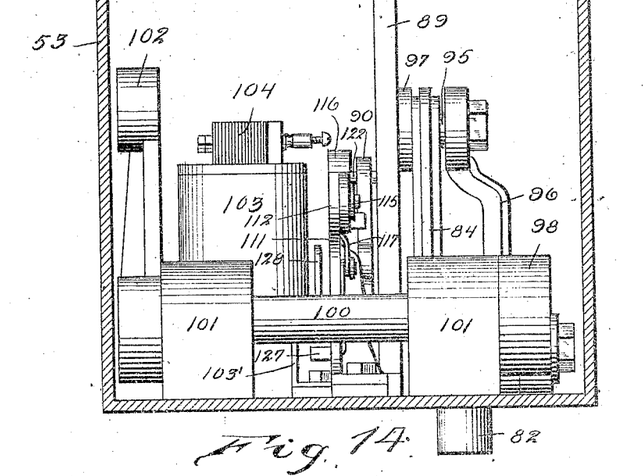
Fig. 14 is an end view of the same.
Figure 15:
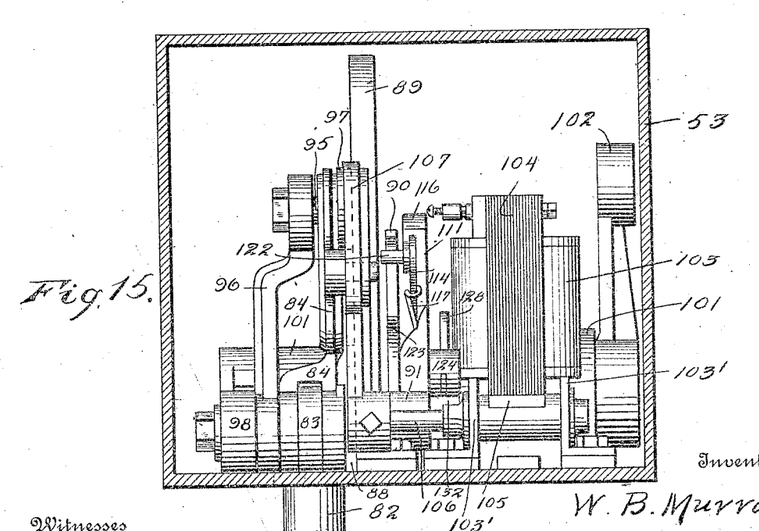
Fig. 15 is a similar view of the opposite end of the apparatus.

I will now proceed to describe the mechanically operated and electrically controlled apparatus disposed within the casing 53. Rigidly connected with the upper end of the push rod 73 is a socket 82 (see Fig. 12) carrying an apertured extension 83, disposed within the lower forked end of a pivoted arm or element 84. This lower forked end of the arm 84 is provided with openings to receive a horizontal shaft 85, which also passes through the opening in the extension 83. The longitudinal movement of the shaft 85 in one direction is limited by an element 86 attached thereto by means of a screw 87 or the like. The shaft 85 extends through a central opening in a vertically movable carriage 88, which travels within a relatively stationary upstanding track or guide 89, which is rigidly connected with the bottom wall of the casing 53 by any suitable means. A pivoted arm or element 90 is disposed upon the outer portion of the shaft 85 and is engaged by a ring 91, held against longitudinal displacement by a transverse pin 92 or the like. It is thus seen that the ring 91 and associated elements also serve to prevent the longitudinal displacement of the shaft 85 in one direction. The pivoted arm or element 84 is provided with an inverted L-shaped opening 93, having a horizontal shoulder 94. Disposed within the L-shaped opening 93 is a horizontal bolt 95, which is connected with a depending link 96. The bolt 95 carries a grooved head 97, which operates within the track or guide 89, as shown. The depending link 96 has pivotal connection at its lower end with a crank 98, by means of a bolt 99 or the like. The crank 98 is rigidly mounted upon one end of a horizontal rock-shaft 100, extending through fixed bearings 101. Rigidly connected with the opposite end of the rock-shaft 100 is an upstanding crank 102, which is connected with the train stopping means, as will be described hereinafter.

The electrically operated means for controlling the mechanically operated elements of the apparatus, comprise an upstanding stationary electro-magnet 103 having a horseshoe magnet core 104 formed of laminated sheets of iron. The electro-magnet 103 is adapted to be used with either direct or alternating currents. The electro-magnet 103 is rigidly mounted upon a horizontal fixed support or frame 103'. Disposed near and below the electro-magnet is a swinging lever-armature 105, which is rigidly connected at its outer end with a horizontal rock-shaft 106. This rock-shaft has an upstanding crank 107, rigidly connected with one end thereof. The rock-shaft 106 is journaled through the horizontal support or frame 103'. The upstanding crank 107 is provided through its upper portion with an elongated slot or opening 108, for receiving a transverse pin 109, which is carried by a lateral extension 110 formed upon the upper portion of the arm 84, as shown. It is thus seen that when the electro-magnet 103 is energized, the free end of the lever-armature 105 will be swung upwardly, the rock-shaft 106 turned to swing the upstanding crank 107 to the right, whereby the arm 84 is also swung to the right so that the bolt 95 will clear the shoulder 94 and operate in the longitudinal portion of the L-shaped slot 93. When the arm 84 is elevated through the medium of the mechanically operated elements, it will not raise the link 96.

Rigidly mounted within the casing 53 is an upstanding support 111 provided near its upper end with a lateral extension 112, upon which is pivotally mounted a vertically swinging lever 114, by means of a screw 115 or the like. The upward movement of the lever 114 is limited by a stop 116 formed upon the support 111. A spring 117 is secured upon the support 111 and engages the swinging lever 114 to urge the same upwardly into engagement with the stop 116. At its free end, the lever 114 is provided with an opening 118 so that it may have suitable connection with a cord or wire 119 (see Fig. 5) which operates a valve 120, which in turn actuates a whistle 121, disposed in the cab. It is thus seen that when the lever 114 has its free end swung downwardly, the valve 120 will be operated and the whistle sounded. Instead of employing an audible signal device, I may use a visible signal device and it is to be understood that the term "signaling means" which is employed in the claims, is expressly intended to cover either an audible or visible signal device. The swinging lever 114 has a laterally extending pin 122 rigidly connected therewith between the ends thereof, as shown. This pin 122 is adapted to engage within a recess or notch 123 formed in the swinging arm 90, when the arm is sufficiently elevated to allow the pin 122 to enter said notch. The arm 90 is swung to the right by a weight 124 which is rigidly connected with the arm 90 by a crank 125. Rigidly connected with the arm 90 opposite the crank 125 is a short arm 126, provided with a lateral extension 127, which is engaged by a vertically swinging finger 128. This finger is supported by a horizontal sleeve 129, which is free to turn upon a horizontal shaft 130, which is connected with the support 103'. The sleeve 129 has a downwardly extending finger 131 rigidly connected with its opposite end, which finger is disposed to be engaged by the lever-armature 105. When the carriage 88 is elevated, through the medium of the mechanically operated elements and assuming that the electro-magnet 103 is deënergized, the swinging arm 90 is also elevated so that the pin 122 will enter the opening or notch 123. When the carriage 88 descends, the arm 90 will swing the lever 114 downwardly to operate the swinging means. When the lever 90 has traveled downwardly a certain distance in engagement with the pin 122, said lever will automatically release the pin when the arm 125 engages a fixed trip 132. If the electro-magnet 103 were energized during this operation, the free end of the lever-armature 105 is swung upwardly, finger 131 swung upwardly, finger 128 swung to the left, and arm 90 swung to the left to occupy the position shown in Fig. 16. It is thus seen that the pin 122 could not enter the opening or notch 123, whereby the lever 114 will not be swung downwardly when the carriage 88 descends. The wire 66 (see Fig. 6) is connected with one end of the winding of the electro-magnet 103 and the other end of such winding is connected or grounded with the frame-work of the engine.

Figure 20:
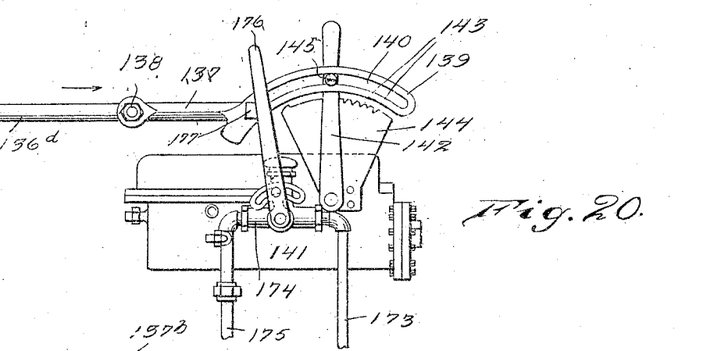
Fig. 20 is a side view of the three-way valve and air brake valve, and associated elements.
Figure 21:
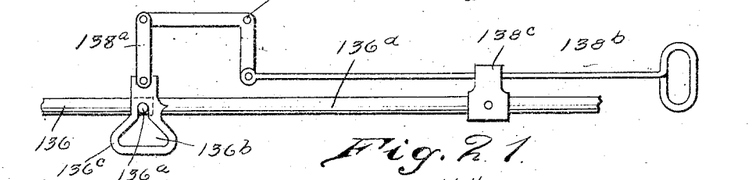
Fig. 21 is a similar view of manually operative means for disconnecting parts of the apparatus, and, Fig. 22 is a central longitudinal sectional view through a cylinder included in the means to move the throttle lever.

The crank 102 (see Fig. 5) is pivotally connected with a rod 133, which is pivotally connected with the lower portion of a vertically swinging lever 134. This vertically swinging lever is suitably pivotally connected at its lower ends with the framework of the engine, as shown at 135. The lever 134 is pivotally connected at its upper end with a rod 136. The rod 136 is mounted to reciprocate within a fixed bracket 136' and is provided at one end with a laterally extending pin 136$^a$. This laterally extending pin fits within a substantially triangular opening 136$^b$ formed through a head 136$^c$. The head 136$^c$ is formed upon a rod 136$^d$, which is pivotally connected with a short rod 137, as shown at 138. When the pin 136$^a$ is disposed within the contracted upper portion of the opening 136$^b$, it affords an operative connection between the rods 136 and 136$^d$. In order that this operative connection may be broken, I provide a swinging bell-crank lever 137$^a$, pivoted to a portion of the engine, as shown at 137$^b$. A link 138$^a$ connects one arm of the bell-crank lever 137$^a$ with the head 136$^c$, as shown. The bell-crank lever 137$^a$ is manually operated by a push rod 138$^b$, pivotally connected therewith and operating through a guide 138$^c$ attached to the rod 136$^d$, as shown. It is thus seen that the engineer may, if circumstances require it, entirely disconnect the mechanically operated and electrically controlled apparatus from the train stopping means, to be described. The short rod 137 carries a segment 139, which is provided with a curved elongated slot 140. Disposed within the cab of the engine is an air brake valve 141 operated by an upstanding lever 142, provided with suitable latch means (not shown) to engage teeth 143 of a fixed segment 144. The lever 142 carries a laterally extending pin 145, disposed within the slot 140, as more clearly shown in Fig. 20.

Figure 19:
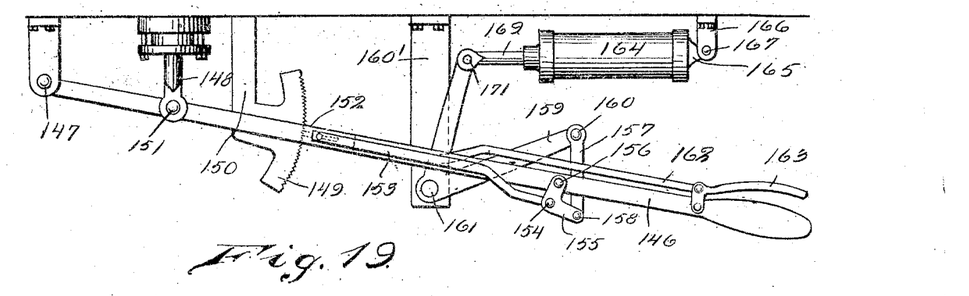
Fig. 19 is a plan view of the throttle lever and associated elements.

The numeral 146 designates a swinging throttle lever, pivoted, as shown at 147. This throttle lever moves a valve stem 148 to supply or cut off the steam in starting or stopping the engine. The valve stem 148 is disposed above the throttle lever 146 and a segment 149 is disposed below said throttle lever, said segment being provided with a shank 150. A bolt 151 pivotally connects the valve stem 148 and the throttle lever 146. The segment 149 is held stationary by shank 50, as is customary. This segment is provided with teeth to be engaged by latch means 152, whereby the lever 146 may be securely held in adjustment at different positions. The latch means 152 is moved to release the lever 146 by a longitudinally movable rod 153 pivotally connected, as shown at 154, with a bell-crank lever 155. This bell-crank lever is pivotally connected with the throttle lever 146, as shown at 156. A link 157 is disposed below the throttle lever 146 and is pivotally connected at one end with the bell-crank lever 155, as shown at 158 and at its opposite end with a large bell-crank lever 159, as shown at 160. The bell-crank lever 159 is pivotally mounted upon a fixed horizontal bracket 160′, as shown at 161. The latch means 152 may also be operated by a rod 162, which is moved by a manually operated grip 163.

Figure 22:
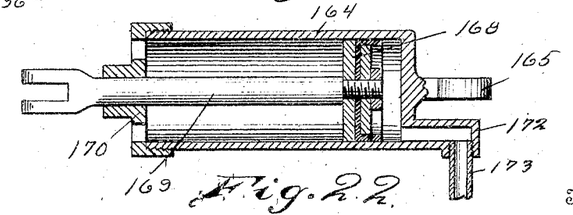

The numeral 164 designates a bodily swinging cylinder, provided at one end with an extension 165, which is pivotally connected with a fixed bracket 166, by means of a bolt 167 or the like. A piston 168 is disposed to operate within the cylinder 164 and is connected with a piston rod 169, operating through an apertured head 170. The piston rod 169 is pivotally connected at its free end with the inner end of the bell-crank lever 159, as shown at 171. The cylinder 164 is provided near and below the extension 165 with an inlet pipe 172, connected with a pipe 173, such connection being disposed in alinement with the pivoted bolt 167 and of such a character to allow of the slight swinging movement of the cylinder 164. The pipe 173 is connected with a three-way valve structure 174, which is connected with a pipe 175 that leads to a compressed air storage tank or air line pipe. The three-way valve structure is adapted to alternately establish communication between the pipes 173 and 175 and to break such communication and establish communication between the pipe 173 and the atmosphere. The operating parts of the valve structure 173 are moved by an upstanding lever 176, disposed near the segment 139 and in the path of travel of a lug 177, formed thereon. It is thus seen that when the short rod 137 is moved longitudinally as indicated by the arrow, the lever 176 will first be moved to establish communication between pipes 173 and 175, whereby compressed air will be supplied to the cylinder 164 and the throttle lever 146 swung inwardly for cutting off the supply of steam. Subsequently to this, the pin 145 engages the end wall of the slot 140, whereby lever 142 is swung for applying the brakes. When the short rod 137 moves longitudinally in a reverse direction, both levers 176 and 142 remain in their set positions and will stay in these positions until manually moved therefrom by the engineer.

In the claims I will use the term "train stopping means" and it is to be understood that the same is expressly intended to cover either the brake applying means or the means for cutting off the supply of steam or both. This train stopping means also applies to the brake applying means used on electric cars.

Figure 16:
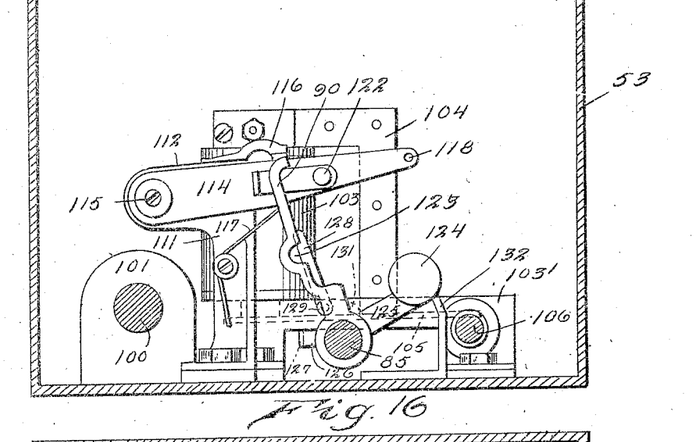
Fig. 16 is a sectional view taken on line 16—16 of Fig. 11, the device being energized and the operating parts shown in their lower positions.
Figure 17:
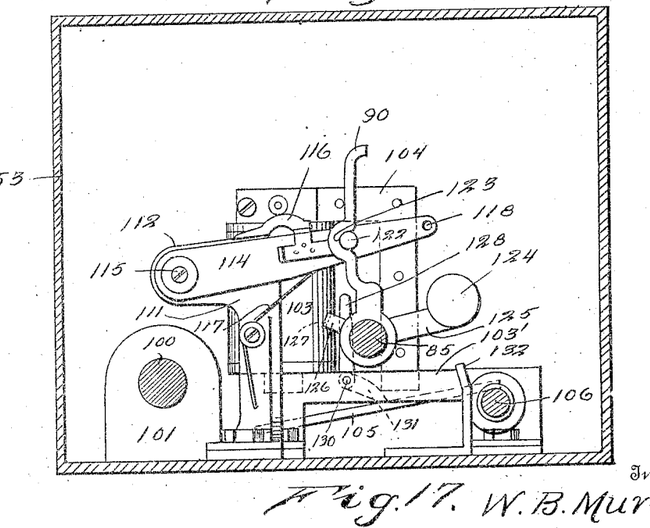
Fig. 17 is a similar view, the device being deënergized and the elements being shown in their elevated positions.
Figure 18:
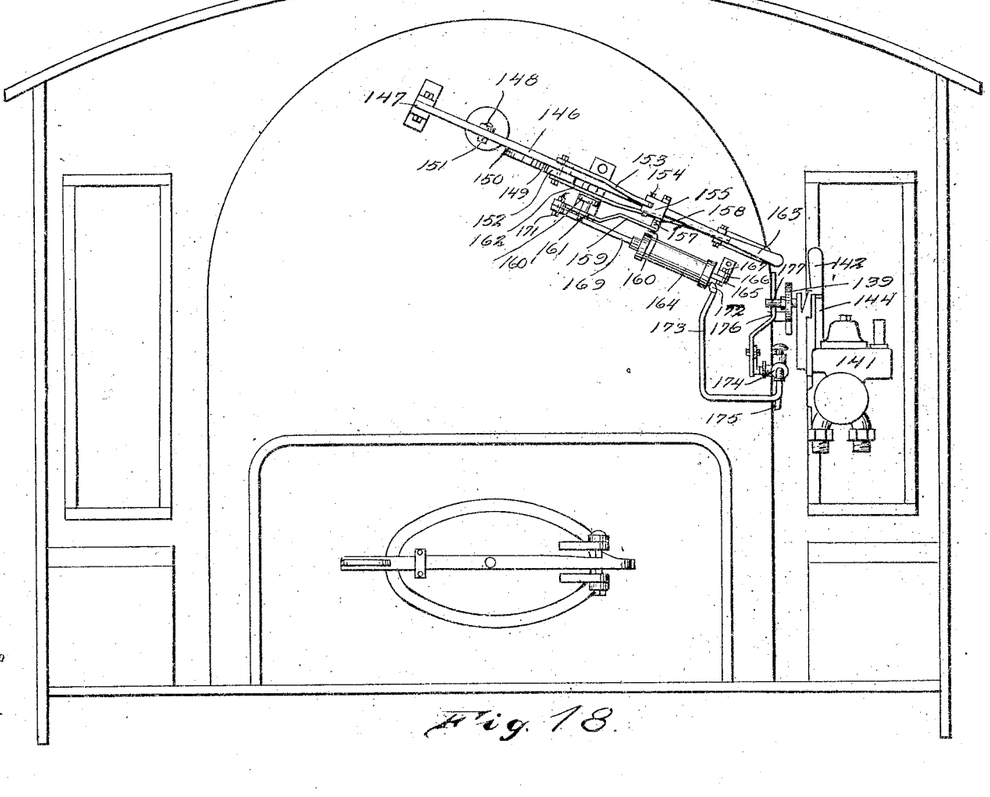
Fig. 18 is an end view of the engine boiler as viewed in the cab.

The operation of the system is as follows: Assuming that all of the blocks are clear, the semaphore paddles will be disposed in their lowermost positions. The train passing into block C from block D moves into proximity to the ramp 4, whereby the shoe 62 will engage the extension 8 of the ramp-section 6. This extension 8 moves the mechanically operated elements of the apparatus slightly but not sufficiently to actuate the train stopping means. The shoe is moved into engagement with the ramp-section 6, which is in electrical connection with the source of current 19. As soon as this takes place a circuit is closed for energizing the electro-magnet 103, whereby the pivoted arm 84 is swung to the right so that such arm will not move the link 96 when the rod is elevated. The engine is thus allowed to pass the ramp 4 without being stopped. When the above referred to circuit is closed for energizing the electro-magnet 103, current flows from one pole of the source of current 19, through armature 18, wire 22, contact segment 21, wire 41, electro-magnet 38, contact 40, contact segment 31, contact 42, wire 43, ramp-section 6, shoe 62, wire 66, electro-magnet 103, the frame-work of the engine, rail 1, wire 19′, and back to the opposite pole of the source of current 19. When this circuit is closed the electro-magnet 38 is energized, whereby the holding pawl 36 is moved to release the disk 34, which is rigidly mounted upon the rock-shaft 27. The gravity operated crank 32 now drops to its lowermost position, turning the rock-shaft 27 in the same direction, whereby contact 42 is disconnected from contact segment 31 and the above referred to circuit is opened and ramp-section 6 disconnected from the source of current 19. The shoe 62 and associated elements are further elevated but do not now move the link 96, since the arm 84 has been previously swung to its inoperative position. The shoe 62 now travels into engagement with the ramp-section 5, whereby a circuit is closed for energizing the electro-magnet 103. In this circuit, current flows from one pole of the source of current 19 through armature 18, wire 22, segment 21, contact 24, wire 44, ramp-section 5, shoe 62, wire 66, electro-magnet 103, the frame-work of the engine, rail 1, wire 19', and back to the opposite pole of the source of current. When the shoe 62 and associated elements begin to descend as they approach the outer end of the ramp-section 5, the carriage 88 also descends, pulling the pivoted arm 90 downwardly, and the electro-magnet 103 being energized the arm 90 is swung to the left, as shown in Fig. 16, whereby the pin 122 will not enter the recess 123 and the lever 114 will remain in its elevated position. It is thus seen that the engine is allowed to pass both ramp-sections 5 and 6 upon entering the clear block C without the train stopping and signal means being actuated. As the engine moves into proximity to each ramp, the same operation takes place, provided all of the blocks are clear. When the engine has entered the block C, the paddle 12$^c$ is swung to its uppermost or danger position, whereby rock-shaft 27 is first turned to its normal position and then upwardly past such normal position. The paddle 12$^c$ remains in this uppermost position until the engine has traveled into the block B, when the paddle 12$^c$ will be moved to its intermediate position to indicate caution. When the engine has traveled into block A, where it is now located, the paddle 12$^c$ will be moved to its lowermost position. The engine being in block A the paddle 12$^a$ is in its uppermost position, the paddle 12$^b$ is in its intermediate position, and the paddle 12$^c$ is in its lowermost position. Assuming that a second engine has passed the ramp 4 at the entrance end of block C and moves into proximity to the ramp 4 at the entrance end of block B, the shoe 62 is moved into engagement with the extension 8 of the ramp-section 6, whereby the mechanically operated elements of the apparatus are slightly moved, subsequently to which the shoe engages ramp-section 6, whereby a circuit is closed for energizing the electro-magnet 103 which prevents further operation of the mechanically operated elements by the shoe being elevated. In this closed circuit, current flows from one side of the source of current 19, through armature 18, wire 22, segment 21, wire 41, electro-magnet 38, wire 39, contact 40, contact segment 31, contact 42, wire 43, ramp-section 6, shoe 62, wire 66, electro-magnet 103, the frame-work of the engine, rail 1, wire 19', and back to the opposite pole of the source of current 19. The shoe 62 now travels into engagement with the ramp-section 5, the circuit being broken when the shoe engages the insulation 7, whereby electromagnet 103 is deënergized. The ramp-section 5 is disconnected from the source of current 19 since contact 24 is in engagement with the insulation 25. The arm 90 being in its elevated position, as shown in Fig. 17, and the electro-magnet 103 being deënergized, the pin 122 will enter recess 123. When the arm 90 descends, which occurs when the shoe 62 approaches the outer end of the ramp-section 5, the lever 114 will be swung downwardly, whereby cable 119 will be pulled to actuate the valve 120, which causes the whistle 121 to be sounded. It is thus seen that as the engine passes the ramp at the entrance end of the block B, the train stopping means are not actuated but the whistle is sounded to inform the engineer that the block A is occupied. When the engine approaches the entrance end of block A the shoe 62 engages the extension 8 and then the ramp-section 6. This ramp-section 6 is disconnected from the source of current 19, at the contact 40 and segment 31, contact 23 and insulation 25 and contacts 20 and 20'. The electro-magnet 103 remaining deënergized, the shoe 62 will be elevated which causes the rod 73 to be elevated, whereby the arm 84 will raise the link 96. This link turns the rock-shaft 100, which causes the train stopping means to be actuated. It is thus seen that the engine will be stopped by the ramp 4 before it enters the block A.

When the block A is occupied by a train, paddle 12$^a$ should be swung to its uppermost or danger position as shown. If this has been done, the engine will be allowed to pass the ramp 45, which is placed a considerable distance from the entrance end of the block. Assuming that the engine in the block A is approaching the ramp 45, the shoe 62 will engage the ramp 45, whereby a circuit will be closed for energizing the electro-magnet 103, so that the arm 84 will be swung to its inoperative position. In this circuit current flows from one pole of the source of current 50, through wire 49, contact 48, contact segment 30, contact 47, wire 46, ramp 45, wire 66, electro-magnet 103, the framework of the engine, rail 1, wire 51, and back to the opposite pole of the source of current. It is thus seen that when the paddle 12$^a$ is properly swung to its danger position upon the entrance of the train into block A, the ramp 45 will be connected with the source of current 50, whereby such engine is allowed to pass the ramp 45 without actuating the train stopping means. If, however, the paddle 12$^a$ should not be operated upon the entrance of the engine into the block contact 48 would disengage contact segment 30, whereby the ramp 45 would have no connection with the source of current 50 and hence the train stopping means would be actuated when the shoe 62 travels into engagement with the ramp 45. By this means the engineer can tell whether the paddle has been properly operated to protect the rear of the engine upon entering a block.

Particular attention is called to the fact that the apparatus carried by the engine, automatically disconnects the ramp-section 6 from the source of current upon the engine entering the block. This protects the rear of the engine while the same is entering the block. As soon as the engine enters the block, electro-magnet 15 is cut out of the track circuit, whereby the contacts 20 and 20' are disconnected and the ramp-section 6 is further disconnected from the source of current 19 at this point. If the paddle 12ᵃ should be improperly set to indicate a clear track when in fact the block is occupied, it is obvious that the engine will be stopped by the ramp-section 6, which is now disconnected from the source of current 19. When the paddle 12ᵃ is properly swung to its danger position, the ramp-section 6 is disconnected from the source of current 19 at a third point by contact 23 and the insulation 25.

It is to be understood that the form of my invention herewith shown and described, is to be taken as a preferred example of the same, and that certain changes in the shape, size, and arrangement of parts may be resorted to without departing from the spirit of the invention or the scope of the subjoined claims.

Having thus described my invention, I claim:—

1. In apparatus of the character described, a pair of spaced rock-shafts; a vertically movable carriage disposed between the rock-shafts; operating connecting means between the carriage and one rock-shaft; means moved by the other rock-shaft to render the operating connecting means inactive; electrically operated means to turn the second named rock-shaft; mechanically operated means to move the carriage; and train control means operated upon the movement of the first named rock-shaft.

2. In apparatus of the character described, spaced operating and operated rock-shafts; a relatively stationary track disposed between the rock-shafts; a carriage mounted to move upon the track; normally active operating connecting means between the carriage and the operated rock-shaft; means connecting the operating rock-shaft and the operating connecting means and adapted upon the movement of the operating rock-shaft to render the operating connecting means inactive; an armature-lever connected with the operating rock-shaft to turn the same; an electro-magnet disposed in proximity to the armature-lever and adapted when energized to move it; mechanically operated means to move the carriage; and train control means operated by and upon the movement of the operated rock-shaft.

3. In apparatus of the character described, operating and operated pivoted members; a mechanically operated element arranged near the pivoted members; normally active operating connecting means between the mechanically operated element and the operated pivoted member; means connected with and operated upon the movement of the operating pivoted member and adapted upon such movement to render the operating connecting means inactive; means to move the operating pivoted member; and train control means operated by and upon the movement of the operated pivoted member.

4. In apparatus of the character described, substantially horizontal spaced operating and operated rock-shafts; a substantially vertical relatively stationary track arranged between the rock-shafts; a carriage to move upon the track; a mechanically operated and vertically movable member connected with the carriage to move the same; an upstanding link pivoted with the carriage and provided with an inverted substantially L-shaped slot; a pin mounted to operate within the slot and having a head operating in engagement with the track; a depending link pivoted with the pin; a crank pivoted with the depending link and connected with the operated rock-shaft to turn the same; train control means operated by the movement of the operated rock-shaft; a lateral extension secured to the slotted link and provided with a pin; an upstanding crank having a slot to receive the pin of the extension and connected with the operating rock-shaft to be moved thereby; and electrically operated means to turn the operating rock-shaft.

5. In apparatus of the character described, a substantially vertical relatively stationary track; a member engaging the track to travel longitudinally thereof; a carriage engaging the track below the member to travel longitudinally of the track; a link pivoted to the carriage and provided with a slot having a shoulder and adapted to receive a portion of said member; mechanically operated means to move the carriage; electrically operated means to swing the slotted link; and train control means operated by and upon the movement of the member in one direction.

6. In a train control system of the character described, a relatively stationary guide track to be suitably mounted upon a vehicle, a carriage slidably engaging the guide track, a plurality of arms pivotally connected with the carriage, train stopping and signal means operated by the pivoted arms, mechanically operated means to move the carriage, a rock-shaft, a crank connected with the rock-shaft for swinging one of the pivoted arms, a lever-armature connected with said rock-shaft to turn the same, an electro-magnet to move the lever-armature, means operated by said lever-armature to swing the other pivoted arm, a shoe connected with the mechanically operated means and connected in circuit with the electro-magnet, a ramp to engage the shoe, and a partial circuit including a source of current connected with the ramp.

7. In apparatus of the character described, a relatively stationary substantially vertical track; a member engaging the track to travel longitudinally thereof; a vertically swinging link having a slot provided with a shoulder and adapted to receive a portion of the member; reciprocatory mechanically operated means to raise and lower the slotted link; electrically operated means to swing the link; and train control means operated by and upon the movement of the member in one direction.

8. In a train control system of the character described, a track, a vehicle to travel thereon, a guide track suitably mounted upon the vehicle, a carriage engaging the guide track, a swinging arm pivotally connected with the carriage, a transverse bolt adapted to be moved by the swinging arm and having a head engaging the guide track, a link connected with the transverse bolt, means connected with the link to actuate train stopping means, means including an electrical device to swing the pivoted arm so that it will not move the transverse bolt, a reciprocatory structure connected with the carriage, a shoe connected with the reciprocatory structure and having electrical connection with said electrical device, a stationary ramp disposed in the path of travel of the shoe, and a partial circuit including a source of current having one pole thereof electrically connected with the ramp.

9. In apparatus of the character described, a swinging and longitudinally movable link having a recess provided with a shoulder; a member adapted to be vertically moved and extending into the recess of the link; train control means operated upon the movement of the member in one direction; a lateral extension carried by the link and provided with a pin; a swinging lever having a slot to slidably receive the pin; and electrically operated means to swing the slotted lever.

10. In apparatus of the character described, a longitudinally movable carriage; mechanically operated means to move the carriage; a link pivotally connected with the carriage and provided with a recess having a shoulder; train control means embodying a movable element carrying an extension adapted to engage with the shoulder of the recess of the link when the carriage is moved to a predetermined position and the link remains in its normal position; a crank connected with the link and carrying a weight to normally hold the link in the active position; a stationary member to engage and move the crank to trip the link; and electrically operated means to swing the link to the inactive position.

11. In apparatus of the character described, a vertically movable carriage; mechanically operated means to move the carriage; a link pivotally connected with the carriage and provided with a recess having a shoulder; a pivoted lever provided with an extension to engage with the shoulder of the recess when the carriage is moved to a predetermined position with the pivoted link in the active position; means to normally retain the pivoted lever elevated; train control means adapted to be operated upon the downward movement of the pivoted lever; means to normally retain the pivoted link in the active position with respect to the carriage; and means to swing the pivoted link to the inactive position with respect to the carriage.

12. In apparatus of the character described, a vertically swinging armature-lever; an electro-magnet arranged in proximity thereto to move it; a bell crank lever having one arm disposed in the path of travel of the armature-lever to be engaged and moved thereby; a vertically movable carriage; mechanically operated means to move the carriage; an arm pivotally connected with the carriage and swung by the movement of the bell crank lever; a movable element adapted for detachable engagement with the pivoted arm; and train control means operated by the movable element.

13. In a train control system of the character described, a mechanically operated reciprocatory structure, a plurality of arms pivotally connected therewith, train stopping and signal means operated by the pivoted arms, a rock-shaft, connecting means between the rock-shaft and one pivoted arm, a lever armature to turn the rock-shaft, an electro-magnet to move the lever armature, and means to swing the other arm including an element engaged by the lever armature.

14. In a train control system of the character described, a relatively stationary guide track to be suitably mounted upon a vehicle, a carriage mounted to reciprocate therein, mechanically operated means to move the carriage, a plurality of arms disposed upon opposite sides of and pivotally connected with the carriage, train stopping and signal means operated by the pivoted arms, and electrical means adapted upon being energized to move both arms to their inoperative positions.

15. In a train control system of the character described, a track, a vehicle to travel thereon, a support mounted upon the vehicle, an upstanding guide track fixed upon the support, a carriage slidably engaging the guide track, a plurality of swinging arms disposed upon opposite sides of the carriage and pivotally connected therewith, a rock-shaft disposed upon one side of the guide track, a crank connected with the rock-shaft and one swinging arm, a lever armature connected with the rock-shaft to turn the same, an electro-magnet to move the lever-armature, a movable element to be operated by the other swinging arm, means to move said other swinging arm including an element disposed in the path of travel of said lever armature, a transverse bolt operating within the guide track and adapted to be moved by one of the swinging arms, a depending link connected with the transverse bolt, a crank connected with the link, and a rock-shaft disposed upon the opposite side of the guide track and connected with the last named crank.

16. In a train control system, a reciprocatory mechanically operated structure, an operating arm pivotally connected therewith, an element carrying an extension to be engaged by the operating arm and thereby moved upon the movement of the reciprocatory structure in one direction, a weight device connected with the operating arm and normally serving to hold the same in a position so that the arm will have operative engagement with the extension, a relatively stationary trip to engage the weight device when the reciprocatory structure is near the end of its travel in one direction to effect a disengagement between the extension and the operating arm, and electrically operated means to effect a disengagement between the operating arm and extension.

In testimony whereof I affix my signature in presence of two witnesses.

WILLIAM B. MURRAY.

Witnesses:
JAMES L. CRAWFORD,
B. H. WILBURN.